(12) United States Patent
Minor et al.

(10) Patent No.: US 7,992,795 B2
(45) Date of Patent: Aug. 9, 2011

(54) SHAPE MEMORY ALLOY ACTUATOR

(75) Inventors: Gary A. Minor, Coppell, TX (US);
Jeffrey W. Brown, Los Gatos, CA (US)

(73) Assignee: Air System Components, Inc., Richardson, TX (US)

( * ) Notice: Subject to any disclaimer, the term of this patent is extended or adjusted under 35 U.S.C. 154(b) by 695 days.

(21) Appl. No.: 11/947,889

(22) Filed: Nov. 30, 2007

(65) Prior Publication Data
US 2008/0128524 A1 Jun. 5, 2008

Related U.S. Application Data

(60) Provisional application No. 60/861,814, filed on Nov. 30, 2006.

(51) Int. Cl.
*G05D 23/02* (2006.01)
(52) U.S. Cl. ..... 236/103; 236/101 R
(58) Field of Classification Search ..... 236/93 R, 236/101 R, 103; 251/11, 303; 137/468
See application file for complete search history.

(56) References Cited

U.S. PATENT DOCUMENTS

| | | | | |
|---|---|---|---|---|
| 2,283,311 A * | 5/1942 | Bevins | ..... | 73/179 |
| 3,195,441 A * | 7/1965 | Hedrick | ..... | 236/49.5 |
| 3,378,199 A * | 4/1968 | Snell | ..... | 236/49.5 |
| 3,848,799 A * | 11/1974 | Day | ..... | 236/49.5 |
| 3,929,280 A * | 12/1975 | Kloot | ..... | 236/1 B |
| 3,940,935 A * | 3/1976 | Richardson et al. | ..... | 60/528 |
| 4,233,779 A * | 11/1980 | Griffith | ..... | 47/29.5 |
| 4,284,235 A * | 8/1981 | Diermayer et al. | ..... | 236/1 G |
| 4,586,335 A * | 5/1986 | Hosoda et al. | ..... | 60/528 |
| 4,699,314 A * | 10/1987 | Faurie | ..... | 236/49.5 |
| 4,761,955 A * | 8/1988 | Bloch | ..... | 60/528 |
| 4,979,672 A * | 12/1990 | AbuJudom et al. | ..... | 236/68 B |
| 5,865,418 A * | 2/1999 | Nakayama et al. | ..... | 251/11 |
| 6,851,260 B2 * | 2/2005 | Mernøe | ..... | 60/527 |
| 7,093,817 B2 * | 8/2006 | MacGregor et al. | ..... | 251/11 |
| 2002/0113499 A1* | 8/2002 | von Behrens et al. | ..... | 310/12 |

(Continued)

FOREIGN PATENT DOCUMENTS

JP 2001-3850 1/2001

(Continued)

OTHER PUBLICATIONS

International Search Report for International Application No. PCT/US2007/086036 dated Oct. 15, 2008.

(Continued)

*Primary Examiner* — George Nguyen
(74) *Attorney, Agent, or Firm* — J. A. Thurnau, Esq.; T. A. Dougherty, Esq.; P. N. Dunlap, Esq.

(57) ABSTRACT

A shape memory alloy (SMA) actuator for engaging and actuating a device. The actuator includes an engagement mechanism, a bias element, and a SMA object(s). The SMA actuator may automatically and passively transfer to a backup or redundant feature that resets or extends the actuator's operational life. In one embodiment, the SMA actuator includes an additional SMA object(s) that replaces the primary SMA object(s) in the event the primary SMA object(s) breaks. The SMA actuator may also be configured to apply a dynamic stress to the SMA object during transition of the object to modify the transition temperatures of the object. The SMA actuator may be part of a fluid distribution system, such as a heating, ventilation, and air conditioning (HVAC) system and used to control the flow of fluid, such as air, from the distribution system.

21 Claims, 6 Drawing Sheets

U.S. PATENT DOCUMENTS

2004/0112049 A1* 6/2004 Behrens et al. ............... 60/527
2005/0115235 A1   6/2005 Mernoe
2006/0172694 A1* 8/2006 Gau et al. ..................... 454/333

FOREIGN PATENT DOCUMENTS

JP      2004-100537      4/2004
WO      2004097218      11/2004

OTHER PUBLICATIONS

Written Opinion for International Application No. PCT/US2007/086036 dated Oct. 15, 2008.

* cited by examiner

SHAPE MEMORY ALLOY ACTUATOR

RELATED APPLICATIONS

This application claims priority to, and any benefit of, U.S. Provisional Patent Application Ser. No. 60/861,814, filed on Nov. 30, 2006, entitled SHAPE MEMORY ALLOY ACTUATOR, the entire disclosure of which is fully incorporated herein by reference.

BACKGROUND

Shape memory alloys (SMAs) are metallic alloys that may recover apparent permanent strains when they are heated above a certain temperature. SMAs have two stable states or phases; a hot or austenite state and a cold or martensite state. The temperatures at which the SMA changes states (i.e. its crystallographic structure) are a characteristic of the particular alloy. Selecting the material composition of the alloy and anneal temperatures of the alloy may be used to control the alloy's transition temperatures.

In the austenite state, the alloy is hard and rigid, while in the martensite state, the alloy is softer and flexible. In the martensite state, the SMA may be stretched or deformed by an external force. Upon heating, the SMA will return to its austenite state and contract or recover any reasonable stretch that was imposed on it. Thus, the SMA recovers with more force that was required to stretch it out. This exerted force upon contraction may be used to perform any number of tasks such as, but not limited to, turning a device on or off, opening or closing an object, or actuating a device or object.

HVAC systems provide air or another fluid to compartments, such as rooms for example. A diffuser may be provided at the system outlet to distribute, in a particular way, the air or other fluid entering the room. For example, the diffuser may have one or more blades to direct the flow of the air.

Due to the buoyancy effect of air (i.e. cold air will naturally sink and hot air will naturally rise), heating air and cooling air are preferably provided to a room in different patterns. When both heating and cooling air are provided to the room through a single diffuser, the ability to adjust the diffuser to provide different flow patterns is desirable. Some diffusers may be manually adjusted while other diffusers may sense supply air temperature and adjust the diffuser through the use of a powered control system, bimetallic strips, or wax motors.

SUMMARY

The present application is directed to a shape memory alloy (SMA) actuator. The actuator may have an engagement mechanism for engaging and actuating a device, a bias element associated with the engagement mechanism, and an SMA object(s) associated with the engagement mechanism. The SMA object(s) may expand or contract based on the object's temperature. When the temperature increases past a first predetermined value, the SMA object(s) may contract and move the engagement mechanism to a first position. When the temperature decreases past a second predetermined value, the SMA object may expand and the bias element may move the engagement mechanism to a second position.

The present application also discloses an exemplary SMA actuator that may automatically and passively transfer to a backup or redundant feature that resets or extends the actuator's operational life. In one exemplary embodiment, an SMA actuator may include an additional or redundant SMA object(s) that replaces the primary SMA object(s) in the event the primary SMA object(s) fails. The actuator may have the additional or redundant SMA object(s) attached to a movable part in such a way that if the primary or active object(s) fails, the redundant object(s) moves into an active position. In one embodiment, the movable part is a rotatable cam mechanism and the SMA object(s) is an SMA wire(s).

In another exemplary embodiment, the actuator uses multiple SMA objects that each has an individual stress load to allow for consistency in the transitions temperatures of actuator. Thus, in the event of a single SMA object failure, the secondary SMA object will have the proper stress load and continue to operate at the intended transition temperatures.

In another exemplary embodiment, the SMA actuator may be configured to be part of a fluid distribution system, such as a heating, ventilation, and air conditioning (HVAC) system, and, more particularly, may be used to control the flow of fluid, such as air, from the distribution system. The SMA actuator may cooperate with at least one blade of the diffuser to change the position of the blade in response to the temperature of the fluid without requiring an external energy source. In one embodiment, an SMA object(s) in the actuator contracts in a heating mode and expands in a cooling mode. In another embodiment, the SMA object(s) may connect directly or indirectly with the at least one blade.

Also disclosed is an exemplary diffuser for use in a fluid distribution system. The diffuser may include at least one blade for directing the flow of fluid from the distribution system, and an actuator as described above. Also disclosed is an exemplary fluid distribution system having one or more diffusers, such as the exemplary diffuser described above.

In present application is also directed to an exemplary method for controlling the transition temperature of an SMA object by precisely controlling the stress load imposed on the SMA material. In one exemplary embodiment, the transition temperatures of an SMA actuator are controlled by selecting the stress load placed on the SMA object. In another exemplary embodiment, a dynamic stress load is applied to the SMA object during transition of the object to modify the transition temperatures of the SMA object. Thus, the dynamic stress load allows for the creation of changing temperatures of reaction. For example, in one exemplary embodiment, the stress load on an SMA object is reduced as the SMA object transitions from the martensite state to the austenite state in order to ensure complete transition to the austenite state once the transition begins.

Further aspects and concepts will become apparent to those skilled in the art after considering the following description and appended claims in conjunction with the accompanying drawings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of the invention.

DETAILED DESCRIPTION

The present application discloses a shape memory alloy (SMA) actuator. While the exemplary embodiments illustrated and described herein are presented in the context of an air diffuser actuator having two pairs of SMA wires, each pair attached to a respective spring via a rotatable cam mechanism that may switch the force of the spring from one of the wires to the other, those skilled in the art will readily appreciate that the present invention may be used and configured in other ways. For example, the SMA actuator is not limited to use with an air diffuser or other fluid distribution device. The SMA actuator may be operatively associated with a wide variety of actuatable devices in a wide variety of applications, such as, but not limited to, aerospace, military, medical, safety, and robotics applications.

In the context of a diffuser, the actuator may be used for the dispersion and distribution of any fluid, and not just air, into any compartment, or an open area. The fluid may be, for example, a gas of combination of gases other than air. Furthermore, the actuator may utilize one or more SMA objects other than wires or may include only a single pair of SMA wires or more than two pairs of wires. Still further, the movable part that switches the force of the spring from one of the pair of wires to the other need not be a rotatable cam mechanism. Any movable part that may automatically switch the spring's load may be used. In addition, a biasing element other than a spring may be used. Any device capable of applying a stress load to an SMA object may be suitable.

While various aspects and concepts of the invention are described and illustrated herein as embodied in combination in the exemplary embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

For the purposes of this application, the terms attach (attached), connect (connected), and link (linked) are not limited to direct attachment, connection, or linking but also include indirect attachment, connection, or linking with intermediate parts, components, or assemblies being located between the two parts being attached, connected, or linked to one another.

FIGS. 1-6 illustrate an exemplary embodiment of an SMA actuator 10. The SMA actuator 10 may include a bracket 12 having a first end 14 and a second end 16. The bracket 12 may include a top wall 18 that is generally parallel to a bottom wall 20 and connected to the bottom wall by a front wall 22. The bracket 12 may define a channel 24 in which a first SMA arrangement 26 and a second SMA arrangement 28 may be disposed. The SMA actuator 10, however, may include only a single SMA arrangement or may include more than two SMA arrangements.

In the depicted embodiment, the first SMA arrangement 26 is substantially similar to the second SMA arrangement 28; thus, only the first SMA arrangement will be discussed in detail. The first SMA arrangement 26 may include a first or primary SMA wire 30 and a second or secondary SMA wire 32. The SMA wires 30, 32 are at least partially composed of a shape memory alloy (SMA). The wires must have sufficient SMA to react to temperature changes to produce the actuator changes described herein. References herein to an SMA wire include a wire partially composed of an SMA and a wire that is completely composed of SMA.

In the exemplary embodiment shown, the first SMA wire 30 has a first end 34 and a second end 36 and the second SMA wire 32 has a first end 38 and a second end 40. The first end 34 of the first SMA wire 30 and the first end 38 of the second SMA wire 32 may be fixably attached to the first end 14 of the bracket 12. The second end 36 of the first SMA wire 30 and the second end 40 of the second SMA wire 32 may be attached to a movable or rotatable part 42, such as a cam mechanism for example.

The first SMA arrangement 26 may also include one or more bias elements 44, such as for example one or more springs, as illustrated in FIGS. 1-7. The spring 44 may have a first end 46 attached to the cam mechanism 42 and a second end 48 attached to the second end 16 of the bracket 12. The bracket 12 may have multiple locations or spring pin adjustments 49 to which the second end 48 of the spring 44 may attach to the bracket. The multiple spring pin adjustments 49 allow for adjustments to the size of the spring 44 or the amount of bias force a given spring imposes within the arrangement. The spring 44 and the first and the second SMA wires 30, 32 may be generally arranged along the same axis, though that is not required.

The SMA actuator 10 may also include a lever 50. The lever 50 may be pivotally attached to the bracket 12 by a pivot pin 52 such that the lever may pivot about the pin. The lever 50 may include a first end 54 that is attached to the cam mechanism 42 and a second end 56 that may include an engagement mechanism 58 that engages a portion of an actuated device, such as for example an air diffuser 60 (as described in detail in relation to FIGS. 15 and 16).

The first SMA wire 30 and the second SMA wire 32 may have two stable states or phases, a hot or austenite state and a cold or martensite state. In the austenite state, the SMA wires 30, 32 are hard and rigid and in the martensite state, the SMA wires are softer and flexible. In the martensite state, the SMA wires 30, 32 may be stretched or deformed by an external force. Upon heating, the SMA wires 30, 32 may change states to the austenite state. Upon changing to the austenite state, the SMA wires 30, 32 may contract or recover any reasonable stretch that was imposed on it.

Figure 1:
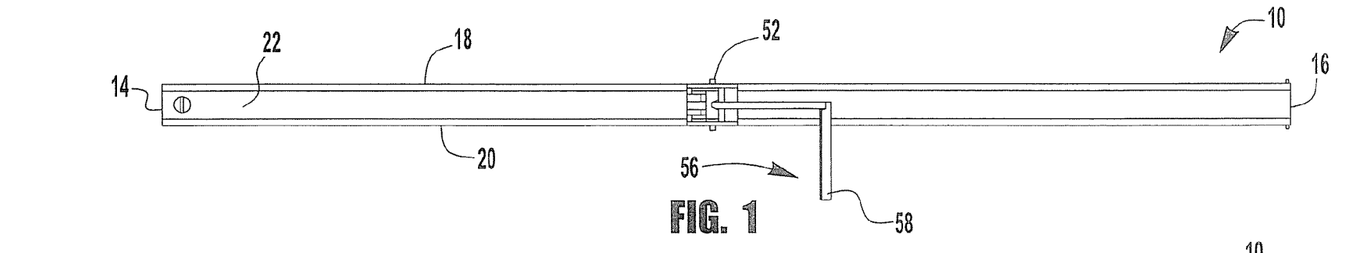
FIG. 1 is a front view of an exemplary embodiment of an SMA actuator.
Figure 2:
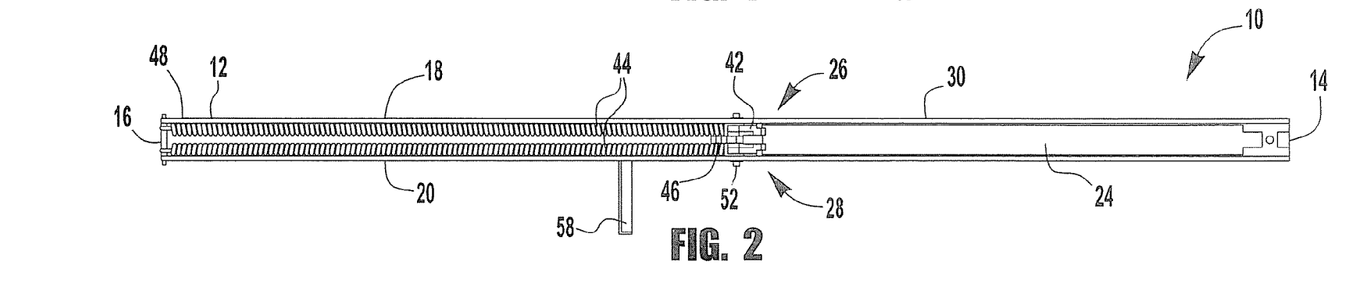
FIG. 2 is a rear view of the exemplary actuator of FIG. 1.
Figure 3:
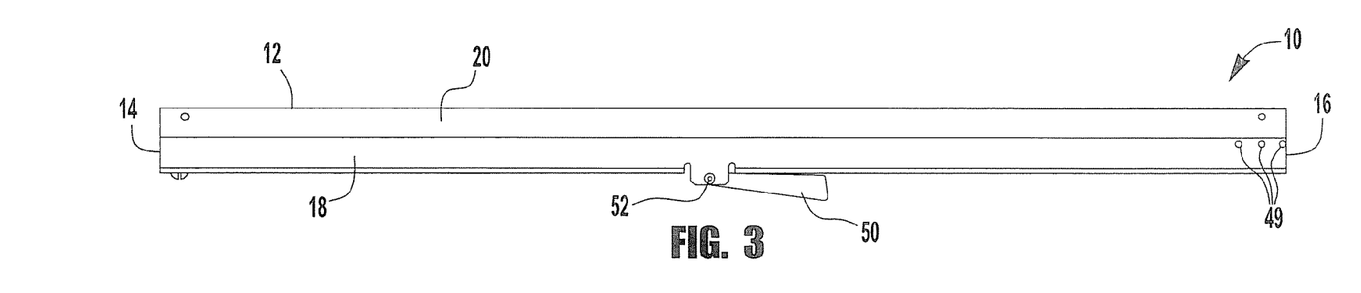
FIG. 3 is a top view of the exemplary actuator of FIG. 1.
Figure 4:
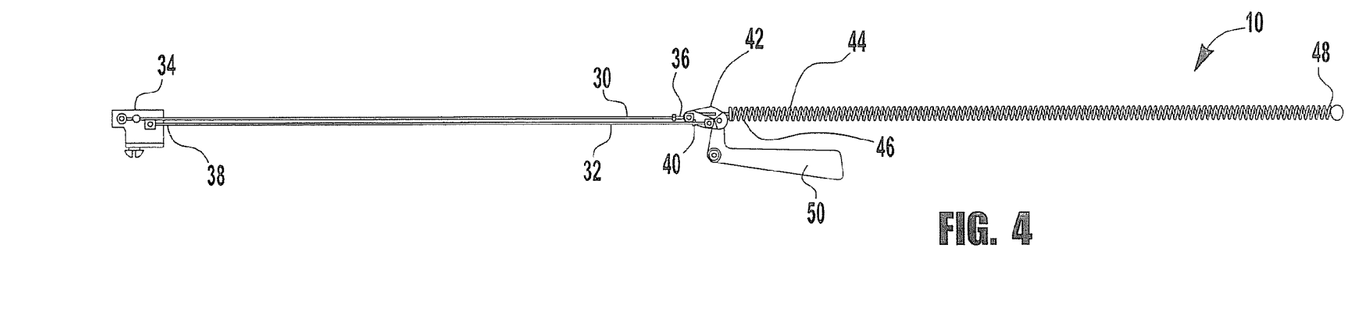
FIG. 4 is a top view of the exemplary actuator of FIG. 1 with the bracket hidden.
Figure 5:
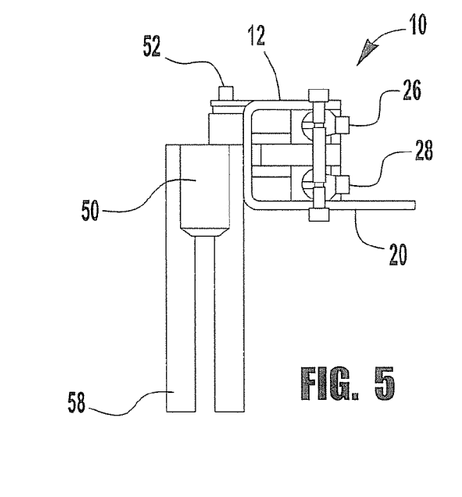
FIG. 5 is a side view of the exemplary actuator of FIG. 1.
Figures 6, 7:
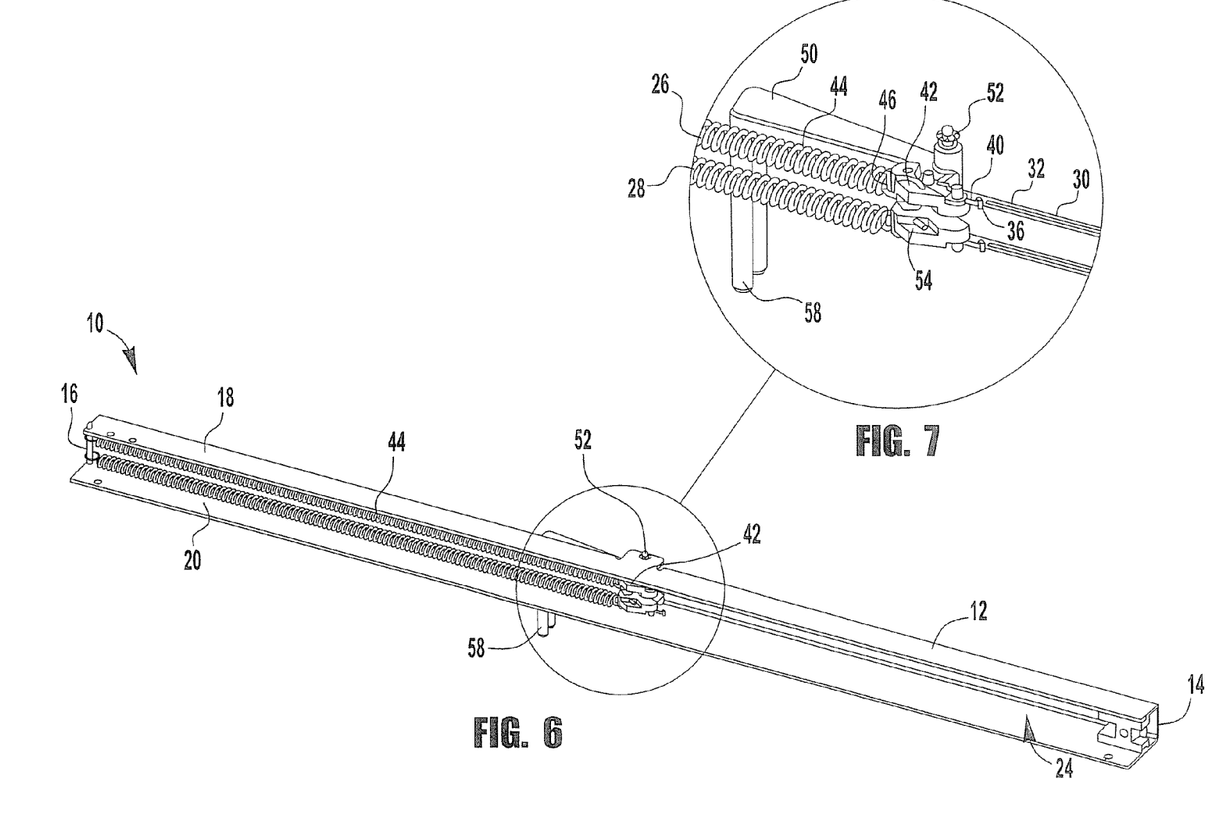
FIG. 6 is an isometric rear view of the exemplary actuator of FIG. 1.
FIG. 7 is an isometric rear view of the exemplary actuator of FIG. 1 enlarged in the area of the cam mechanism with the bracket hidden.
Figure 8:
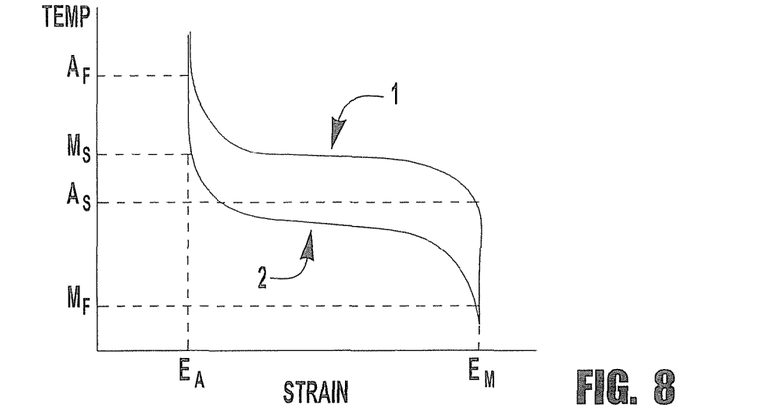
FIG. 8 is a temperature versus strain graph of an SMA wire of the exemplary actuator of FIG. 1 at a first stress load.

FIG. 8 illustrates a temperature vs. strain graph of an exemplary implementation of the first SMA wire 30 with a first constant stress load imposed upon the wire. $M_S$ denotes the temperature at which the first SMA wire 30 generally starts to change from austenite to martensite upon cooling and $M_F$ denotes the temperature at which the transition is generally finished. Accordingly, $A_S$ and $A_F$ denote the temperatures at which the reverse transformation from martensite to austenite generally starts and generally finishes, respectively. Curve 1 depicts the transition of the first SMA wire 30 from the cold or martensite state to the hot or austenite state. As shown, during the state transition, the first SMA wire 30 contracts or recovers the strain between strain $\epsilon_M$ and $\epsilon_A$ over a generally small temperature range. Thus, the state transition may, in general, occur rapidly as the temperature of the SMA rises. Curve 2 depicts the transition of the first SMA wire 30 from the austenite state to the martensite state. Similar to Curve 1, the transition may occurs rapidly, over a generally small temperature range. As illustrated, the start temperature $M_S$ and finish temperature $M_F$ of the first SMA wire 30 when transitioning to the martensite state differs from the start temperature $A_S$ and finish temperature $A_F$ of the first SMA wire when transitioning to the austenite state.

The first and second SMA wires 30, 32 have an internal hysteresis that is a material property of the SMA used. For example, in the context of a HVAC system, the normal operating supply air temperatures are about 55° F. in cooling and about 85° F. in heating. When an SMA is at a temperature less than a first selected temperature, for example, 60° F., it is at its fully expanded or martensite state. As the air temperature increases, there is slight contraction of the material, but at a second selected temperature, for example, 80° F., there is a drastic contraction of the material and at any temperature above 80° F. the material will be in a fully contracted or austenite state. The SMA wire may change its geometry within about one to two seconds, however, the SMA wire may change faster or slower depending on the rate of temperature change. The actual time for the SMA wire to undergo change depends on the material selected for the SMA wire (see below). As the same wire cools, it does not re-expand at 80° F. It only fully expands at 60° F.

Thus, the SMA wire essentially undergoes a prompt or non-gradual change at selected temperatures. This enables the SMA actuator 10 to move the actuated device rapidly. The actual time it takes to actuate a device depends on the configuration of the actuator and the device and the direct or indirect connection between the SMA wire and the device.

Figure 9:
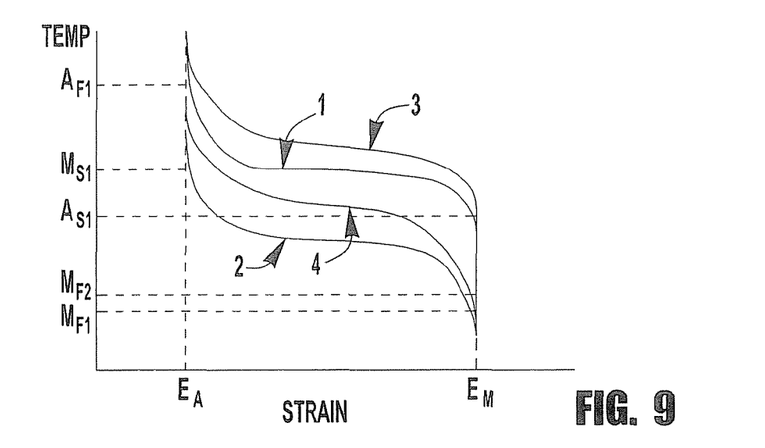
FIG. 9 are temperature versus strain graphs of the SMA wire of FIG. 8 at the first stress load and a second stress load.

FIG. 9 illustrates two temperature vs. strain graphs for the exemplary implementation of the first SMA wire 30, each at a different constant stress level imposed upon the first SMA wire. Curves 1 and 2 are identical to curves 1 and 2 of FIG. 8, which is at the first constant stress level. Curves 3 and 4 illustrate the transitions of the first SMA wire 30 at a second constant stress level that is higher that than first constant stress level. During heating, the amount of force or load exerted on the first SMA wire 30 can shift/raise/lower the transition temperature at which it returns to austenite. During cooling, the amount of force or load exerted on the first SMA wire 30 can shift/raise/lower the transition temperatures at which it returns to martensite. Controlling the load on the SMA will control the transition temperatures and allow the SMA's temperature versus strain characteristics to be customized.

Raising the constant stress load on the first SMA wire 30 increases the start and finish temperatures of both transitions. Thus, the start temperatures $M_{S2}$ and $A_{S2}$ at the higher constant stress are greater that the start temperatures $M_{S1}, A_{S1}$, at the lower constant stress. Similarly, the finish temperatures $M_{F2}$ and $A_{F1}$ at the higher constant stress are greater that the finish temperatures $M_{F1}$, $A_{F1}$ at the lower constant stress. Therefore, changing the amount of stress on the first SMA wire impacts the temperatures at which the wire transitions between states. As shown in FIG. 9, the martensite transition temperatures are raised slightly more that the austenite transition temperatures as a result of the same load increase.

Figure 10:
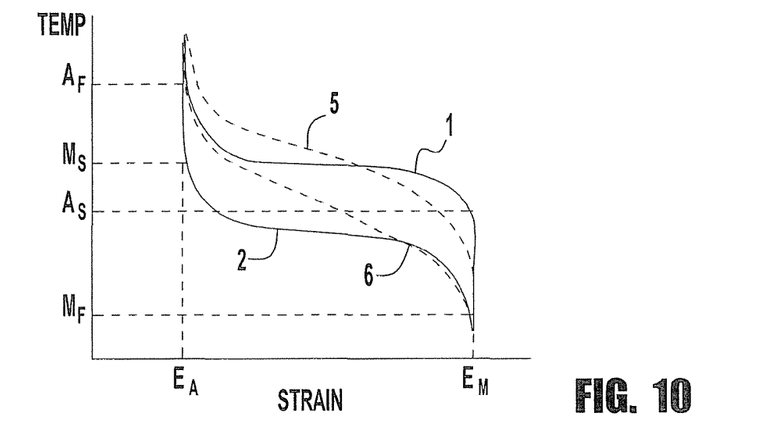
FIG. 10 is a temperature versus strain graph of the SMA wire of FIG. 8 illustrating an impact of dynamic stress loading.

FIG. 10 illustrates the temperature vs. strain graph of FIG. 8 at the first constant stress level (i.e. curve 1 and curve 2) as well as curves 5 and 6, which illustrate an example of how the transition temperatures and curve shape may be modified when the stress level on the wire is dynamically changed (raised or lowered) during the transition. In curve 5, the stress load on the first SMA wire 30 is increased during the wire's transition from martensite to austenite. As a result, curve 5 takes on a more linear transition than with the wire had with a constant stress load (curve 1). Conversely, if the stress load on the first SMA wire 30 is reduced during the transition from martensite to austenite, the curve (not shown) would be flat or flatter (rapid strain change over a small temperature range) than curve 1. Similarly, in curve 6, the stress load is reduced during the transition from martensite to austenite. As a result, curve 6 takes on a more linear appearance. If the stress load on the first SMA were increased during the transition from martensite to austenite, than the curve (not shown) would be flatter.

Figure 11:
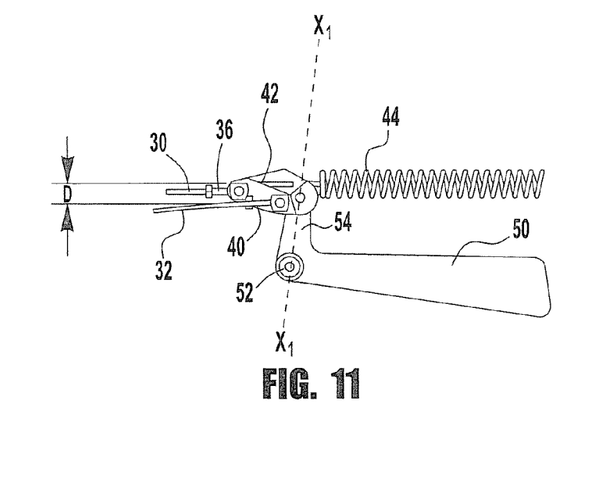
FIG. 11 is a top view of an exemplary embodiment of the cam mechanism of the exemplary actuator of FIG. 1 in a first position.

Referring to FIG. 11, the SMA actuator 10 is depicted in a first position in which the first and second SMA wires 30, 32 are in the hot or austenite state. In the first position (and second position), the first SMA wire 30 and the spring 44 are generally co-axial, though that is not required. The second SMA wire 32 attaches to the cam mechanism 42 offset a distance D from the attachment point between the spring 44 and the cam mechanism 42. The spring 44 applies a first amount of tension to the first SMA wire 30 through the cam mechanism 42. The second SMA wire 32 is under little or no tension, however, because it has a length that is longer than the distance between where the second SMA wire 32 attaches to the first end 14 of the bracket 12 and where the second SMA wire 32 attaches to the cam mechanism 42. In other words, there is slack in the second SMA wire 32. Therefore, in the first position, the first SMA wire 30 is in an active position (positioned to be stressed by the spring 44) and the second SMA wire 32 is in an inactive position (positioned to not be subject to stress from the spring 44). In the first position, the lever 50 may also be considered to be in a first lever position.

Figure 12:
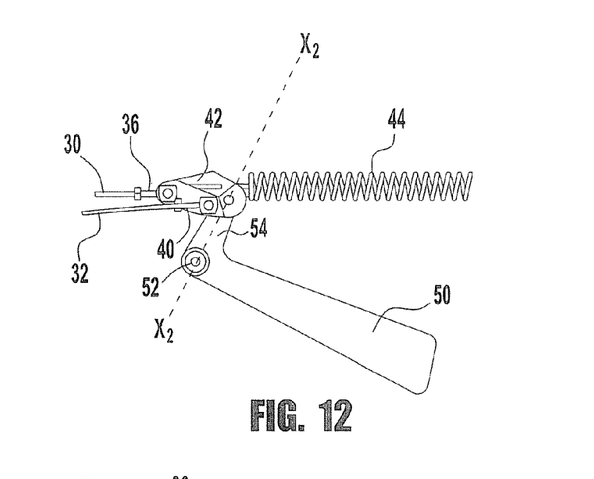
FIG. 12 is a top view of the exemplary embodiment of the cam mechanism of the exemplary actuator of FIG. 1 in a second position.

Referring to FIG. 12, the SMA actuator 10 is depicted in a second position in which first and second SMA wires 30, 32 are in the cold or martensite state. In the second position, the first SMA wires 30 has been stretched or deformed by an external force, such as for example the bias force of the spring 44. Thus, as the temperature of the first SMA wire 30 decreases and reaches the martensite transition start temperature $M_S$, the first SMA wire begins transitioning from the hot or austenite state to the cold or martensite state. In the martensite state, the stress on the first SMA wire 30 from the spring 44 stretches or deforms the wire. As the spring 44 stretches the first SMA wire 30, the spring compresses and moves the cam mechanism 42 to the right, as viewed in the FIGS. 11-14. As the cam mechanism 42 moves to the right, the lever 50 pivots from the lever's first position to the lever's second position.

During the transition of the first SMA wire 30, the second SMA wire 32 may also change states from austenite to martensite. The second SMA wire 32, however, is not subjected to the stress of the spring 44. Thus, the second SMA wire 32 is not deformed when the first SMA wire 30 is deformed. The second SMA wire 32, however, will move with the cam mechanism 42 due to the slack in the wire, but it is not active.

From the martensite state, the SMA wires 30, 32 may transition back to the austenite state if they are heated above the austenite transition start temperature As. During transition to the austenite state, the first SMA wire 30 contracts. The force of the contraction overcomes the bias force imposed by the spring 44. Thus, as the first SMA wire 30 contracts, it expands the spring 44 and moves the cam mechanism 42 to the left, as viewed in the FIGS. 11-14. As the cam mechanism 42 moves to the left, the mechanism pivots the lever 50 from the lever's second position to the lever's first position.

During the transition of the first SMA wire 30, the second SMA wire 32 may also change states from martensite to the austenite. The second SMA wire 32, however, was generally not deformed by the spring 44 in the martensite state; thus, there is little or no deformation for the second SMA wire 32 to recover when transitioning to the austenite state.

Figure 13:
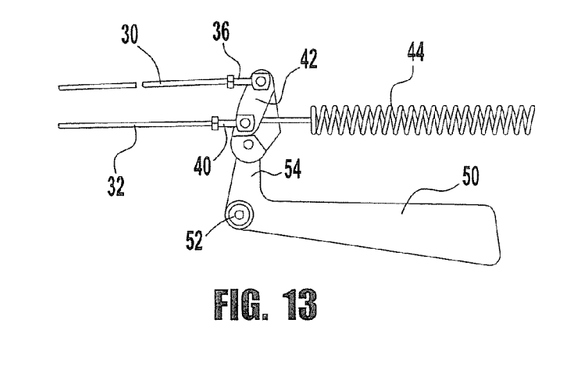
FIG. 13 is a top view of the exemplary embodiment of the cam mechanism of the exemplary actuator of FIG. 1 in a third position
Figure 14:
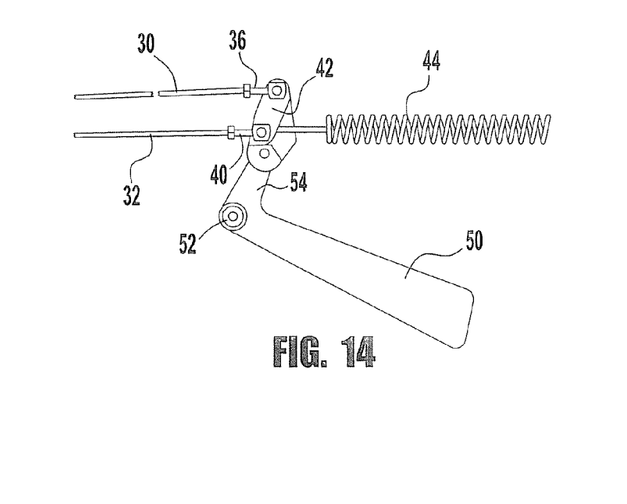
FIG. 14 is a top view of the exemplary embodiment of the cam mechanism of the exemplary actuator of FIG. 1 in a fourth position.

FIGS. 13 and 14 illustrate the SMA actuator 10 in a third and fourth position, respectively, which results from a failure or breaking of the first SMA wire 30. SMA wires typically have a working temperature and stress range within which they may operate for long periods of time. Outside of the working range, however, an SMA wire can fatigue or break.

If the first SMA wire 30 breaks, the cam mechanism 42 may automatically rotate to a position in which the spring 44 imposes a stress onto the second SMA wire 32. Because the spring 44 attaches to the cam mechanism 42 offset the distance D (FIG. 11) from the attachment point between the second SMA wire 32 and the cam mechanism 42, the bias force of the spring 44 will rotate the cam mechanism 42 clockwise, as viewed in FIGS. 11-14 when if first SMA wire 30 breaks. Thus, the second SMA wire 32 is placed into an active position and the first SMA wire 30 is in an inactive position.

Rotation of the cam mechanism 42 to the position depicted in FIGS. 13 and 14, brings the second SMA wire 32 into a position where the spring 44 is exerting a bias force onto the second wire. Thus, the second SMA wire 32 is no longer slack in the third and fourth positions. As the cam mechanism 42 rotates, the force dynamic from the spring 44 may change. For example, the spring 44 is compressed more in the third and fourth positions than it was in the first and second positions. As previously discussed, the amount of stress on the first SMA wire 30 may impact the temperatures at which the first SMA wire transitions. Likewise, the amount of stress on the second SMA wire 32 may impact the temperatures at which the second SMA wire transitions. Since the spring 44 is more compressed in the third and fourth positions as compared to the first and second positions, respectively, the amount of bias force from the spring 44 on the second SMA wire 32 in the third and fourth position is less that was on the first SMA wire 30 in the first and second position. As a result, in order for the second SMA wire 32 to transition at generally the same temperatures as the first SMA wire 30 transitioned prior to failing, the second SMA wire must be smaller in diameter to achieve the same relative stress in the wire. Thus, additional SMA wires (second, third, etc.) in the SMA actuator 10, may be specifically configured and matched the changing spring forces.

Once the cam mechanism 42 rotates such that the second SMA wire 32 is active (i.e. stressed by the spring 44), the SMA actuator 10 may move between the third and fourth positions (FIGS. 13-14, respectively) in a similar manner to how the actuator moved between the first and second positions (FIGS. 11-12, respectively) when the first SMA wire 30 was active. Thus, the SMA actuator 10 has an automatic redundancy or back-up feature that resets the device's operational life if the active SMA wire fails. Each redundant wire provided in the actuator restarts the device's operational life. For example if one wire lasts for 50,000 cycles when it breaks it will be automatically be replaced with a new wire that may last another 50,000 cycles. The SMA actuator 10 also provides a similar stress load in the redundant wire when activated to ensure that the redundant wire transitions at the same temperatures as the primary wire did.

The SMA actuator 10 may be used in a variety of applications, such as for example, a fluid distribution system. For example, the SMA actuator 10 may be used to control the distribution of a fluid, such as air or another gas or combination of gases, to a compartment, such as a room, automatically, based on the temperature of the fluid in the fluid distribution system. The SMA actuator 10 may control the distribution of the fluid without requiring an outside energy source or action on the part of the room's occupants. As the temperature of the fluid in the distribution system reaches a predetermined value, the SMA actuator 10 may adjust the system to provide the fluid in a particular direction or pattern.

Figure 15:
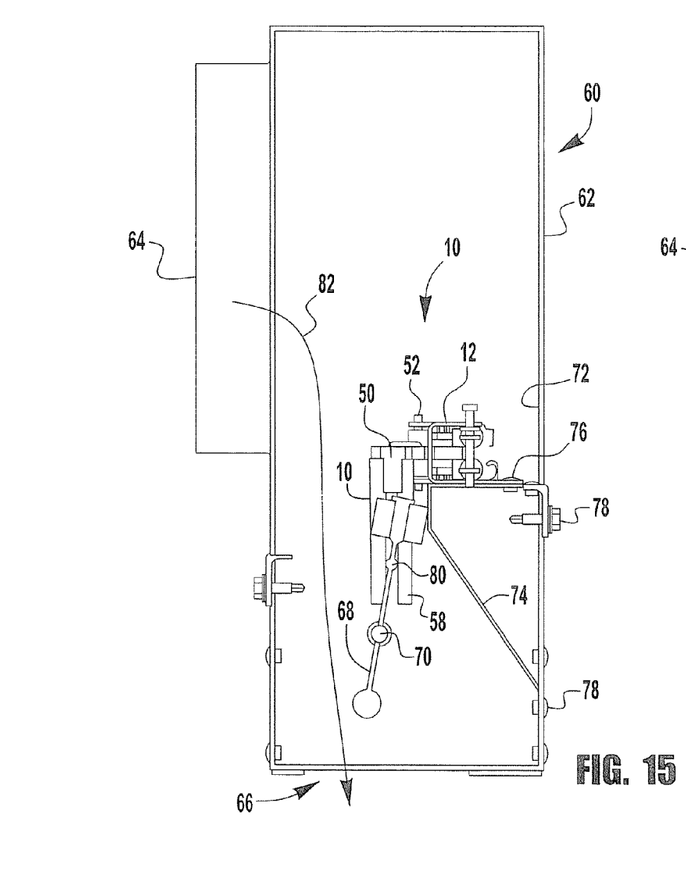
FIG. 15 is a side view of an exemplary embodiment of a fluid distribution system utilizing the exemplary actuator of FIG. 1, illustrated in a first position.
Figure 16:
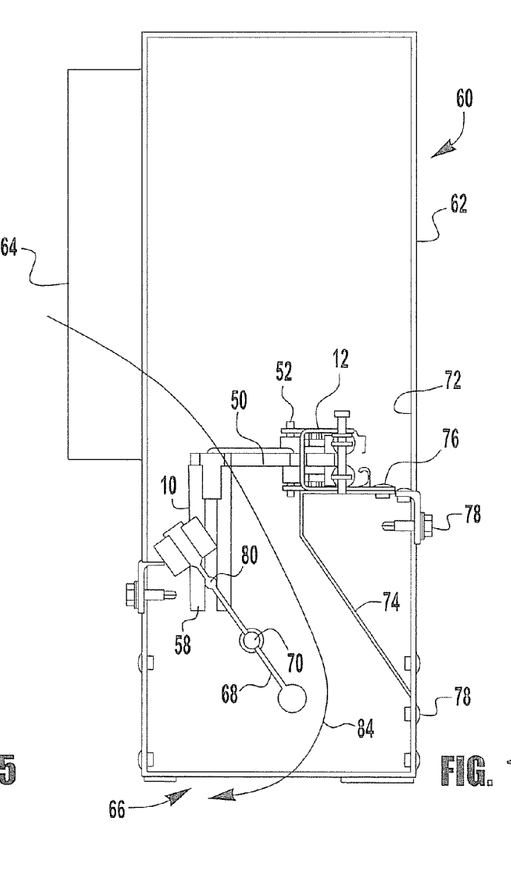
FIG. 16 is a side view of the exemplary fluid distribution of FIG. 15, illustrated in a second position.

FIGS. 15-16 illustrate the SMA actuator 10 as part of an air diffuser 60 for an HVAC system. The depicted air diffuser 60 may be a linear slot, ceiling mounted diffuser. The SMA actuator 10, however, may be used not only with linear slot diffusers, but with other kinds of ceiling diffusers or side wall diffuser applications.

The exemplary air diffuser 60 shown may include a housing 62 having an air inlet 64 and an air outlet 66. The air inlet 66 may be in fluid communication with a source of pressurized air (not shown) and the air outlet 66 may be in fluid communication with a compartment (not shown), such as a room for example. The air diffuser 60 may also include a blade assembly 68 for directing the flow of air out of the diffuser. The blade assembly 68 may be pivotably mounted within the housing 62 about a pivot point 70. The SMA actuator 10 may mount to an inside surface 72 of the housing 62 by any suitable method, such as by a bracket 74 for example. One or more fasteners 76 may be used to mount the SMA actuator 10 to the bracket 74 and one or more fasteners 78 may be used to mount the bracket 74 to the housing 62, though any other suitable manner of attaching the actuator and bracket may be used.

The engagement mechanism 58 of lever 50 may engage a portion 80 of the blade assembly 68 such that movement of the lever 50 moves the blade assembly between a first or heating position (FIG. 15) and a second or cooling position (FIG. 16). The engagement mechanism 58 may include "tongs" that may engage, for example, a straight diffuser blade, or the engagement mechanism may be configured as required to engage different types of diffuser blades.

As shown in FIG. 15, the exemplary blade assembly 68 is in a position such that air flowing through the housing 62 may flow out of the air outlet 66 in a generally perpendicular direction to the outlet, as shown by arrow 82. For an air diffuser mounted at the top of a wall of a room, this flow pattern is advantageous for heating the room because it forces the heating air downward along the wall. Thus, since warm air rises, forcing the air to the bottom of the room more effectively heats the room.

To place the diffuser 60 in the heating position, the actuator lever 50 is in the first position or the third position as illustrated in FIGS. 11 and 13, respectively. Thus, the SMA wires 30, 32 are in the austenite state. The warm air flowing through the housing 62 may be used to heat the SMA wires 30, 32 above the austenite finish temperature $A_F$; thus, the actuator automatically moves the diffuser blade assembly 68 without use of an external power source.

In FIG. 16, the exemplary blade assembly 68 is in a position such that air flowing through the housing 62 is directed around the blade assembly and out of the air outlet 66 generally tangential to the outlet, as shown by arrow 84. For an air diffuser mounted at the top of a wall of a room, this flow pattern is advantageous for cooling because it forces the cooling air along the ceiling. Thus, since cool air sinks, forcing the air along the ceiling of the room more effectively cools the room.

To place the diffuser 60 in the cooling position, the actuator lever 50 is in the second position or the fourth position as illustrated in FIGS. 12 and 14, respectively. Thus, the SMA wires 30, 32 are in the martensite state. The cool air flowing through the housing 62 may be used to cool the SMA wires 30, 32 below the martensite finish temperature $M_F$; thus, the actuator automatically moves the diffuser blade assembly 68 without use of an external power source.

In an application such as an air diffuser, it is desirable for the air diffuser to switch between the heating position and the cooling position as rapidly as possible. A slow change between the two positions or a pause between the two positions may result in air being directed to an undesirable location within the room, such as for example, directly onto an occupant in the room.

The SMA actuator 10 and the air diffuser 60 are configured to ensure that when the transition start temperatures $M_S$ and $A_S$ are reached, the SMA wires 30, 32 transition completely from one state to the other. This is particularly important when the SMA actuator 10 transitions from the second and fourth positions to the first and third positions, respectively, because it is the force of the contracting SMA wire that moves the SMA actuator 10.

The SMA actuator 10 and air diffuser 60 may ensure complete transition of the SMA material by dynamically modifying the stress on the active SMA wire during transition. For example, as the SMA wire 30 transitions to the austenite phase, the SMA actuator 10 and the diffuser 60 are configured to lower the amount of stress on the first SMA wire 30. As a result of the reduced stress, the austenite finish temperature $A_F$ may actually be lower than the austenite start temperature $A_S$. Thus, once rising temperatures start the first SMA wire 30 transitioning to austenite, the first SMA wire 30 will complete the transition to austenite even if the temperature stops rising or rises very slowly.

The SMA actuator 10 and the diffuser 60 may accomplish this in a number of ways. For example, as illustrated in FIGS. 11 and 12, when the lever 50 is in the second position, the force acting on the first end 54 of the lever from the first SMA wire 30 is generally along the wire. The first end 54 of the lever 50, however, is angled from the pivot point 52 as illustrated by line $X_2$ in FIG. 12. As the lever 50 rotates counter clockwise, the angle between the first end 54 and the pivot point 52 decreased resulting in the force from the SMA wire being more efficiently transferred to the lever 50. As a result, the lever 50 is easier to rotate and the effective stress on the first wire 30 is reduced.

As another example, referring to FIGS. 15 and 16, when the exemplary blade assembly 68 is in the cooling position, it is obstructing and redirecting the flow of air through the air diffuser to a greater extent than the position of the blade assembly in the heating position. As a result, when the blade assembly is moving from the cooling position to the heating position, the force of the air onto the blade assembly urges the assembly to the heating position. Thus, the diffuser is configured such that the air aides in the movement of the blade assembly. This aiding force is transferred through the SMA actuator 10 and results in reduced stress on the first SMA wire 30 as it moves the blade assembly 68.

The SMA material selected for the SMA wire may be any suitable SMA, such as for example, nitinol. Other SMA alloys may be used and may be selected to provide different temperature actuation ranges, based on availability, or for any other reason without departing from the spirit and scope of the invention. Other SMA alloys include copper/zinc/aluminum, copper/aluminum/nickel, silver/cadmium, gold/cadmium, copper/tin, copper/zinc, indium/titanium, nickel/aluminum, iron/platinum, manganese/copper, iron/manganese/silicon, and other nickel/titanium alloys. SMA alloys are sold, for example, under the brand names Muscle Wires®, Flexinol®, and BioMetal®, which are registered trademarks of Mondotronics, Inc., Dynalloy, Inc., and Toki Corporation, respectively.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. A shape memory alloy actuator, comprising:
    a first shape memory alloy object and a second shape memory alloy object;
    a movable member to which the first shape memory alloy object and a second shape memory alloy object attach;
    the movable member being movable between a first position and a second position;
    a bias element attached to the movable member, wherein the bias element applies a stress to the first shape memory alloy object when the movable member is in the first position and applies a stress to the second shape memory alloy object when the movable member is in the second position, wherein in the first position the second shape memory alloy object is not subject to stress from the bias element and in the second position the first shape memory alloy object is not subject to stress from the bias element; and
    the bias element is generally coaxial with the first shape memory alloy object when the movable member is in the first position and generally coaxially with the second shape memory alloy object when the movable member is in the second position.

2. The shape memory alloy actuator of claim 1 wherein the movable member automatically moves from the first position to the second position when the first shape memory alloy object fails.

3. The shape memory alloy actuator of claim 1 further comprises a bracket, wherein the first shape memory alloy object has a first end that is attached to the bracket and a second end that is attached to the movable member and the second shape memory alloy object has a first end that is attached to the bracket and a second end that is attached to the movable member.

4. The shape memory alloy actuator of claim 3 wherein the bias element has a first end that is attached to the bracket and a second end that is attached to the movable member.

5. The shape memory alloy actuator of claim 4 wherein the bracket has a plurality of locations adapted to connect to the first end of the bias element.

6. The shape memory alloy actuator of claim 3 wherein the movable member is rotatable relative to the bracket and axially movable relative to the bracket.

7. The shape memory alloy actuator of claim 1 further comprising a lever pivotally attached to a housing and movable between a first lever position and a second lever position, the lever having a first end attached to the movable member.

8. The shape memory alloy actuator of claim 6 wherein when the movable member is in the first position, the first shape memory alloy object contracts as a function of temperature to move the pivotal lever from the second lever position to the first lever position.

9. The shape memory alloy actuator of claim 8 wherein the stress on the first shape memory alloy object decreases as the first shape memory alloy object contracts.

10. The shape memory alloy actuator of claim 6 wherein the bias element biases the pivotal lever toward the second lever position.

11. A shape memory alloy actuator, comprising:
  a first shape memory alloy wire and a second shape memory alloy wire, wherein each shape memory alloy wire includes a first fixed end and a second end;
  a cam to which the second end of the first shape memory alloy wire and the second end of the second shape memory alloy wire attach, the cam being rotatable between a primary position and secondary position; and
  a bias element attached to the cam such that the bias element applies a stress to the first shape memory alloy wire in the primary position and applies a stress to the second shape memory alloy wire in the secondary position, the bias element is generally coaxial with the first shape memory alloy wire when the cam is in the primary position and generally coaxially with the second shape memory alloy wire when the cam is in the secondary position; and
  a lever attached to the movable member and pivotable about an axis, wherein each shape memory alloy wire is capable of expanding and contracting as a function of temperature such that when the shape memory alloy wire being stressed contracts, the lever moves to a first lever position and when the shape memory alloy being stressed expands, the lever moves to a second lever position.

12. The shape memory alloy actuator of claim 11 wherein when the cam is in the primary position, the second shape memory alloy wire is not subject to stress from the bias element.

13. The shape memory alloy actuator of claim 11 wherein the cam automatically moves from the primary position to the secondary position when the first shape memory alloy wire fails.

14. A diffuser for a fluid distribution system, comprising a housing;
  a blade assembly pivotally mounted within the housing and movable between a first position and a second position;
  a blade actuator, comprising a bias element adapted to move the blade assembly from the first position to the second position;
  a first shape memory alloy object adapted to move the blade assembly from the second position to the first position against the bias of the bias element when the first shape memory alloy object is in an active position;
  a second shape memory alloy object adapted to move the blade assembly from the second position to the first position against the bias of the bias element when the second shape memory alloy object is in an active position, wherein the second shape memory alloy object is not subject to the bias force from the bias element when the first shape memory alloy object is in an active position.

15. The diffuser of claim 14 wherein second shape memory alloy object automatically transitions to an active position when the first shape memory alloy object fails.

16. The diffuser of claim 14 further comprising a movable member to which the bias element, the first shape memory alloy object, and the second shape memory alloy object attach.

17. The diffuser of claim 14 wherein the blade actuator is mounted within the housing.

18. The diffuser of claim 14 wherein the blade actuator further comprises a pivotal lever having a first end attached to the movable member and a second end adapted to engage the blade assembly.

19. The diffuser of claim 14 wherein the first shape memory alloy object is generally coaxial with the bias element when the first shape memory alloy object is the active position, and wherein the second shape memory alloy object moves to a position that is generally coaxially with the bias element when the second shape memory alloy object moves from an inactive position to an active position.

20. The diffuser of claim 14 wherein the housing further comprises a fluid inlet and a fluid outlet, and wherein fluid flowing from the fluid inlet to the fluid outlet applies a force to the blade assembly that reduces the stress load on the shape memory alloy wire in the active position as the shape memory alloy wire moves the blade assembly from the second position to the first position.

21. A diffuser for a fluid distribution system, comprising a housing;
  a blade assembly pivotally mounted within the housing and movable between a first blade position and a second blade position;
  a blade actuator mounted within the housing, the blade actuator, comprising a bias element adapted to move the blade assembly from the first blade position to the second blade position;
  a first shape memory alloy object adapted to move the blade assembly from the second blade position to the first blade position against the bias of the bias element when the first shape memory alloy object is in an active position, wherein the first shape memory alloy object is generally coaxial with the bias element when the first shape memory alloy object is the active position;

a second shape memory alloy object adapted to move the blade assembly from the second blade position to the first position against the bias of the bias element when the second shape memory alloy object is in an active position, wherein the second shape memory alloy object is not subject to the bias force from the bias element when the first shape memory alloy object is in an active position, and wherein the second shape memory alloy object moves to a position that is generally coaxially with the bias element when the second shape memory alloy object moves from an inactive position to an active position; and a movable member to which the bias element, the first shape memory alloy object, and the second shape memory alloy object attach, the movable member adapted to automatically move the second shape memory alloy object from the inactive position to the active position when the first shape memory alloy object fails.

* * * * *